United States Patent
Hsin et al.

(10) Patent No.: US 10,122,297 B2
(45) Date of Patent: Nov. 6, 2018

(54) POWER CONVERSION SYSTEM AND OPERATION METHOD FOR THE SAME

(71) Applicant: DELTA ELECTRONICS, INC., Tauyuan (TW)

(72) Inventors: Wei-Lun Hsin, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/491,211

(22) Filed: Apr. 19, 2017

(65) Prior Publication Data
US 2018/0062540 A1    Mar. 1, 2018

(30) Foreign Application Priority Data

Aug. 25, 2016   (TW) .............................. 105127178 A

(51) Int. Cl.
*H02M 7/539*     (2006.01)
*H02M 1/14*      (2006.01)
(Continued)

(52) U.S. Cl.
CPC ............. *H02M 7/539* (2013.01); *H02M 1/14* (2013.01); *H02M 7/48* (2013.01); *H02M 7/537* (2013.01); *H02J 3/383* (2013.01)

(58) Field of Classification Search
CPC .................................. H02M 7/539; H02M 1/14
See application file for complete search history.

(56) References Cited

U.S. PATENT DOCUMENTS 5,260,864 A  * 11/1993 Simonelli ............... H02M 7/48
                                                        323/299
8,988,915 B2 *  3/2015 Ku ................... H02M 7/53871
                                                        363/132
(Continued)

FOREIGN PATENT DOCUMENTS

| EP | 2903144 | 8/2015 | |
| EP | 2903144 A1 * | 8/2015 | ........ H02M 7/53873 |
| WO | WO 2009152600 | 12/2009 | |

OTHER PUBLICATIONS

Extended Search Report dated Nov. 23, 2017 from corresponding application No. EP 17170686.4-1809.

*Primary Examiner* — Jue Zhang
(74) *Attorney, Agent, or Firm* — Hauptman Ham, LLP

(57) ABSTRACT

A power conversion system includes an input capacitor group, a first-converting circuit, a second-converting circuit, a first filter circuit, a second filter circuit, a third filter circuit and a control circuit. The input capacitor group receives a direct-current-input voltage. The first-converting circuit and the second-converting circuit are connected to the input capacitor group in parallel. The first filter circuit includes a first output inductor and a second output inductor. The second filter circuit includes a third output inductor and a fourth output inductor. The third filter circuit is connected between the first filter circuit and the second filter circuit. The control circuit separately controls the first-converting circuit and the second-converting circuit. The first output inductor is connected to the first-converting circuit, the second-converting circuit and the second output inductor. The third output inductor is connected to the second-converting circuit, the first-converting circuit and the fourth output inductor.

20 Claims, 11 Drawing Sheets

(51) Int. Cl.
*H02M 7/48* (2007.01)
*H02M 7/537* (2006.01)
*H02J 3/38* (2006.01)

(56) References Cited

U.S. PATENT DOCUMENTS

| | | | |
|---|---|---|---|
| 9,306,474 B2 | 4/2016 | Chen et al. | |
| 2007/0211507 A1* | 9/2007 | Ilic | H02M 3/1584 363/132 |
| 2011/0255316 A1* | 10/2011 | Burger | H02J 3/32 363/98 |
| 2015/0214859 A1 | 7/2015 | Chen et al. | |
| 2016/0226397 A1* | 8/2016 | Hsin | H02M 7/487 |

* cited by examiner

POWER CONVERSION SYSTEM AND OPERATION METHOD FOR THE SAME

BACKGROUND

Field of the Invention

The present invention relates to a power conversion system and an operation method for the same, and especially relates to a solar photovoltaic power conversion system having a dual-buck inverter and an operation method for the same.

Description of the Related Art

FIG. 1 shows a circuit diagram of the related art dual-buck inverter. A dual-buck inverter 100A receives a direct-current-input voltage Vdc and converts the direct-current-input voltage Vdc into an alternating-current-output voltage Vac and supplies power to a load (not shown in FIG. 1). The dual-buck inverter 100A comprises two buck circuits which are a first buck circuit 11A and a second buck circuit 12A. Moreover, the first buck circuit 11A mainly comprises a first switch T1, a second switch T2, a first diode D1, a second diode D2, a first output inductor L1 and a second output inductor L2. The second buck circuit 12A mainly comprises a third switch T3, a fourth switch T4, a third diode D3, a fourth diode D4, a third output inductor L3 and a fourth output inductor L4. The first buck circuit 11A and the second buck circuit 12A are connected to the direct-current-input voltage Vdc in parallel.

One side of the first output inductor L1 is connected between the first switch T1 and the first diode D1. One side of the second output inductor L2 is connected between the second switch T2 and the second diode D2. One side of the third output inductor L3 is connected between the third switch T3 and the third diode D3. One side of the fourth output inductor L4 is connected between the fourth switch T4 and the fourth diode D4. The first output inductor L1 and one side of the second output inductor L2 are connected to an output capacitor C and one side of the alternating-current-output voltage Vac. The third output inductor L3 and one side of the fourth output inductor L4 are connected to the output capacitor C and the other side of the alternating-current-output voltage Vac.

FIG. 2 shows a waveform diagram of an embodiment of the driving signals of the related art dual-buck inverter. Please refer to FIG. 1 as well. A driving signal generation circuit (not shown in FIG. 1 or FIG. 2) generates a first control signal Sca1 and a second control signal Sca2 which control the first switch T1, the second switch T2, the third switch T3 and the fourth switch T4. The first control signal Sca1 controls the first switch T1 and the fourth switch T4. The second control signal Sca2 controls the second switch T2 and the third switch T3. In the positive half cycle, the first control signal Sca1 switches (namely, turns) on/off the first switch T1 and the fourth switch T4 (at the time t0-t1 interval). In the negative half cycle, the second control signal Sca2 switches on/off the second switch T2 and the third switch T3 (at the time t1-t2 interval). If the load is not a pure resistive load, a phase difference is between the alternating-current-output voltage Vac and the output current.

However, for the related art dual-buck inverter 100A, when switching on/off these switches, the freewheeling current of the inductor returns back to the direct-current-input voltage Vdc, so that the current ripple is greater. Due to the existence of the stray capacitance, the high frequency changing voltage generates greater leakage current and common-mode noise. Therefore, it is desirable to overcome and solve the problems mentioned above and to design a power conversion system comprises following advantages. The freewheeling branch is utilized to eliminate the leakage current and common-mode noise. The features of the switches complementary switching is utilized to provide the reactive power path for the output power comprising the reactive power. The feature of the inductance value of the inductor is utilized to improve the whole circuit efficiency of the dual-buck inverter.

SUMMARY

According to one aspect of the present invention, there is provided a power conversion system for converting a direct-current-input voltage to an alternating-current-output voltage, the power conversion system comprising a first-converting circuit configured to receive the direct-current-input voltage; a second-converting circuit connected to the first-converting circuit in parallel; a first filter circuit comprising a first output inductor and a second output inductor; a second filter circuit comprising a third output inductor and a fourth output inductor; a third filter circuit connected to a one side of the second output inductor and a one side of the fourth output inductor; and a control circuit configured to generate a plurality of control signals to separately control the first-converting circuit and the second-converting circuit, wherein the one side of the first output inductor is connected to the first-converting circuit; an other side of the first output inductor is connected to the second-converting circuit and an other side of the second output inductor; a one side of the third output inductor is connected to the second-converting circuit; an other side of the third output inductor is connected to the first-converting circuit and an other side of the fourth output inductor, and wherein an inductance value of the second output inductor is greater than an inductance value of the first output inductor; and an inductance value of the fourth output inductor is greater than an inductance value of the third output inductor.

According to another aspect of the present invention, there is provided a power conversion system for converting a direct-current-input voltage to an alternating-current-output voltage, the power conversion system comprising a first-converting circuit configured to receive the direct-current-input voltage; a second-converting circuit connected to the first-converting circuit in parallel; a first filter circuit comprising a first output inductor, a second output inductor, and a first freewheeling inductor; a second filter circuit comprising a third output inductor, a fourth output inductor, and a second freewheeling inductor; a third filter circuit connected to a one side of the second output inductor and a one side of the fourth output inductor; and a control circuit configured to generate a plurality of control signals to separately control the first-converting circuit and the second-converting circuit, wherein the one side of the first output inductor is connected to the first-converting circuit; an other side of the first output inductor is connected to a one side of the first freewheeling inductor and an other side of the second output inductor; an other side of the first freewheeling inductor is connected to the second-converting circuit; a one side of the third output inductor is connected to the second-converting circuit; an other side of the third output inductor is connected to a one side of the second freewheeling inductor and an other side of the fourth output inductor; an other side of the second freewheeling inductor is connected to the first-converting circuit, and wherein an inductance value of the second output inductor is greater than an inductance value of the first output inductor and an inductance value of the first freewheeling inductor; and an inductance value of the fourth output inductor is greater than an inductance value of the third output inductor and an inductance value of the second freewheeling inductor.

According to another aspect of the present invention, there is provided an operation method for a power conversion system to convert a direct-current-input voltage into an alternating-current-output voltage, the power conversion system comprising a first filter circuit and a second filter circuit, the first filter circuit comprising a first output inductor and a second output inductor, the second filter circuit comprising a third output inductor and a fourth output inductor, the operation method comprising (a) when the alternating-current-output voltage is in a positive half cycle, the direct-current-input voltage being electrically connected to or disconnected to the first output inductor, the second output inductor, the alternating-current-output voltage and the fourth output inductor to form a positive half cycle energy storage loop, and when the direct-current-input voltage is disconnected, the first output inductor, the second output inductor, the alternating-current-output voltage and the fourth output inductor forming a positive half cycle energy release loop; (b) when the alternating-current-output voltage is in a negative half cycle, the direct-current-input voltage being electrically connected to or disconnected to the second output inductor, the alternating-current-output voltage, the fourth output inductor and the third output inductor to form a negative half cycle energy storage loop, and when the direct-current-input voltage is disconnected, the second output inductor, the alternating-current-output voltage, the fourth output inductor and the third output inductor forming a negative half cycle energy release loop; (c) when the alternating-current-output voltage is a positive half cycle reactive power, the alternating-current-output voltage, the second output inductor, the third output inductor and the fourth output inductor forming a positive half cycle reactive power loop; and (d) when the alternating-current-output voltage is a negative half cycle reactive power, the alternating-current-output voltage, the fourth output inductor, the first output inductor and the second output inductor forming a negative half cycle reactive power loop, wherein an inductance value of the second output inductor is greater than an inductance value of the first output inductor, and wherein an inductance value of the fourth output inductor is greater than an inductance value of the third output inductor.

According to another aspect of the present invention, there is provided an operation method for a power conversion system to convert a direct-current-input voltage into an alternating-current-output voltage, the power conversion system comprising a first filter circuit and a second filter circuit, the first filter circuit comprising a first output inductor, a second output inductor and a first freewheeling inductor, the second filter circuit comprising a third output inductor, a fourth output inductor and a second freewheeling inductor, the operation method comprising (a) when the alternating-current-output voltage is in a positive half cycle, the direct-current-input voltage being electrically connected to or disconnected to the first output inductor, the second output inductor, the alternating-current-output voltage, the fourth output inductor and the second freewheeling inductor to form a positive half cycle energy storage loop, and when the direct-current-input voltage is disconnected, the first output inductor, the second output inductor, the alternating-current-output voltage, the fourth output inductor and the second freewheeling inductor forming a positive half cycle energy release loop; (b) when the alternating-current-output voltage is in a negative half cycle, the direct-current-input voltage being electrically connected to or disconnected to the first freewheeling inductor, the second output inductor, the alternating-current-output voltage, the third output inductor and the fourth output inductor to form a negative half cycle energy storage loop, and when the direct-current-input voltage is disconnected, the first freewheeling inductor, the second output inductor, the alternating-current-output voltage, the fourth output inductor and the third output inductor forming a negative half cycle energy release loop; (c) when the alternating-current-output voltage is a positive half cycle reactive power, the alternating-current-output voltage, the second output inductor, the first freewheeling inductor, the third output inductor and the fourth output inductor forming a positive half cycle reactive power loop; and (d) when the alternating-current-output voltage is a negative half cycle reactive power, the alternating-current-output voltage, the fourth output inductor, the second freewheeling inductor, the first output inductor and the second output inductor forming a negative half cycle reactive power loop, wherein an inductance value of the second output inductor is greater than an inductance value of the first output inductor and an inductance value of the first freewheeling inductor, and wherein an inductance value of the fourth output inductor is greater than an inductance value of the third output inductor and an inductance value of the second freewheeling inductor.

Please refer to the detailed descriptions and figures of the present invention mentioned below for further understanding the technology, method and effect of the present invention. The figures are only for references and descriptions, and the present invention is not limited by the figures.

DETAILED DESCRIPTION OF THE EMBODIMENTS

Figure 1:
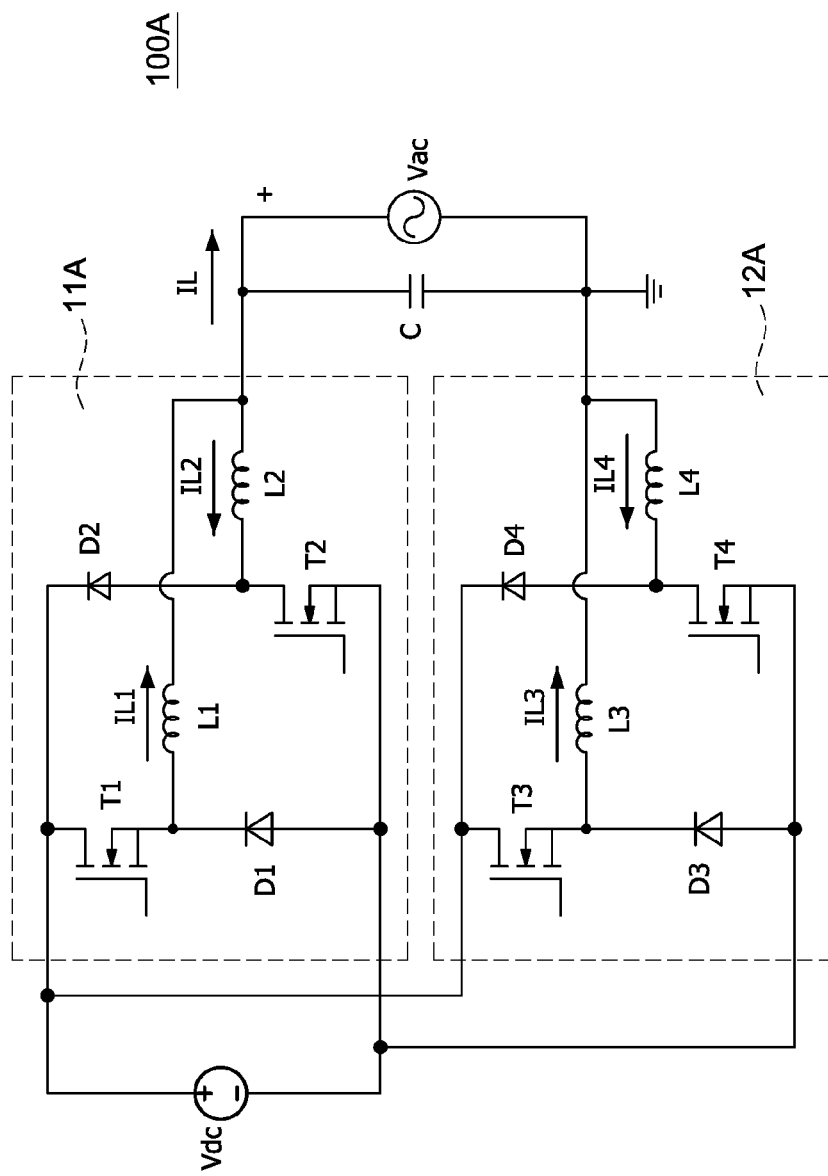
FIG. 1 shows a circuit diagram of a related art dual-buck inverter.
Figure 2:
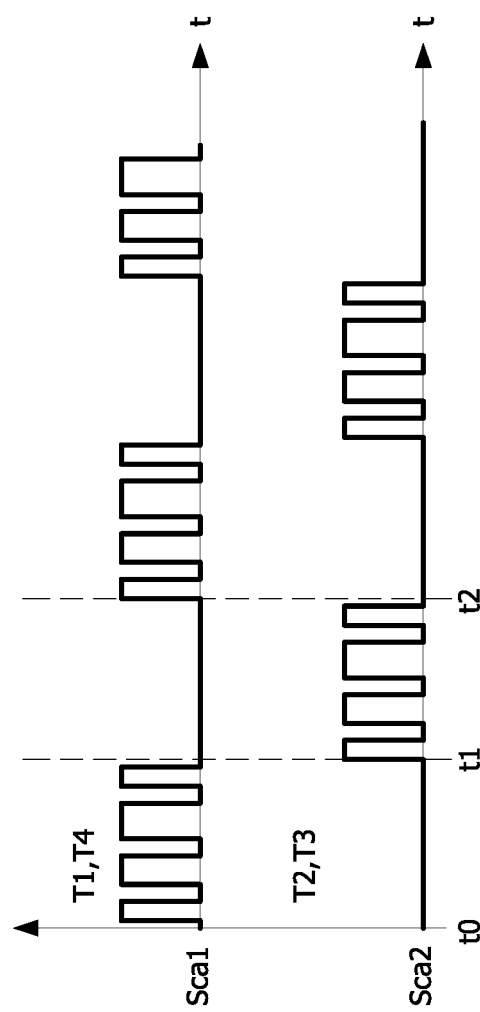
FIG. 2 shows a waveform diagram of an embodiment of the driving signals of the related art dual-buck inverter.
Figure 3:
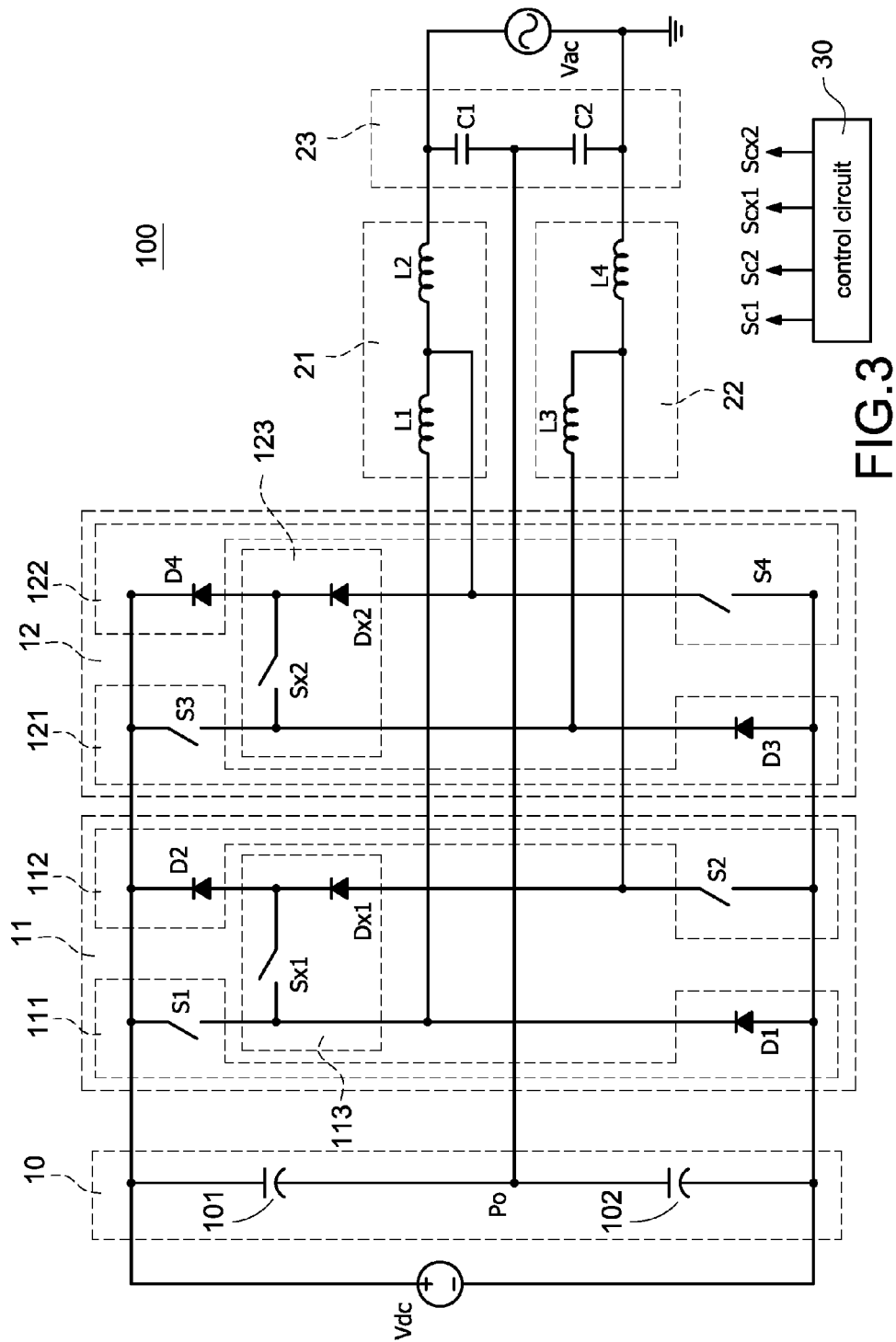
FIG. 3 shows a circuit diagram of a first embodiment of a power conversion system of the present invention.

Shown in FIG. 3, the power conversion system 100 can be a solar photovoltaic power conversion system. The power conversion system 100 converts a direct-current-input voltage Vdc into an alternating-current-output voltage Vac and supplies power to a load (not shown in FIG. 3). The power conversion system 100 comprises an input capacitor group 10, a first-converting circuit 11, a second-converting circuit 12, a first filter circuit 21, a second filter circuit 22, a third filter circuit 23 and a control circuit 30. The input capacitor group 10 comprises a first capacitor 101 and a second capacitor 102. One side of the first capacitor 101 and the second capacitor 102 is connected to a middle point Po. Another side of the first capacitor 101 and the second capacitor 102 is connected to and receives the direct-current-input voltage Vdc in parallel to maintain that a voltage across the first capacitor 101 (or the second capacitor 102) is equal to a half of the direct-current-input voltage Vdc.

The first-converting circuit 11 is connected to the input capacitor group 10 in parallel and receives the direct-current-input voltage Vdc. The first-converting circuit 11 comprises a first branch 111, a second branch 112 and a first auxiliary branch 113. The first branch 111 is formed by a first power switch S1 connected to a first diode D1. The second branch 112 is formed by a second power switch S2 connected to a second diode D2. The first auxiliary branch 113 is formed by a first auxiliary power switch Sx1 connected to a first auxiliary diode Dx1.

Moreover, the first auxiliary branch 113 is connected between the first branch 111 and the second branch 112. The control circuit 30 generates a first control signal Sc1 to control the first power switch S1 and the second power switch S2, and generates a first auxiliary control signal Scx1 to control the first auxiliary power switch Sx1. As shown in FIG. 3, one side of the first power switch S1 is connected to one side (the cathode) of the first diode D1 and one side of the first auxiliary power switch Sx1. The other side of the first power switch S1 is connected to the other side of the first capacitor 101. The other side of the first auxiliary power switch Sx1 is connected to one side (the anode) of the second diode D2 and one side (the cathode) of the first auxiliary diode Dx1. One side of the second power switch S2 is connected to the other side (the anode) of the first auxiliary diode Dx1. The other side of the second power switch S2 is connected to the other side (the anode) of the first diode D1 and the other side of the second capacitor 102.

The second-converting circuit 12 is connected to the input capacitor group 10 in parallel and receives the direct-current-input voltage Vdc. The second-converting circuit 12 comprises a third branch 121, a fourth branch 122 and a second auxiliary branch 123. The third branch 121 is formed by a third power switch S3 connected to a third diode D3. The fourth branch 122 is formed by a fourth power switch S4 connected to a fourth diode D4. The second auxiliary branch 123 is formed by a second auxiliary power switch Sx2 connected to a second auxiliary diode Dx2. Moreover, the second auxiliary branch 123 is connected between the third branch 121 and the fourth branch 122. The control circuit 30 generates a second control signal Sc2 to control the third power switch S3 and the fourth power switch S4, and generates a second auxiliary control signal Scx2 to control the second auxiliary power switch Sx2. As shown in FIG. 3, one side of the third power switch S3 is connected to one side (the cathode) of the third diode D3 and one side of the second auxiliary power switch Sx2. The other side of the third power switch S3 is connected to the other side of the first capacitor 101. The other side of the second auxiliary power switch Sx2 is connected to one side (the anode) of the fourth diode D4 and one side (the cathode) of the second auxiliary diode Dx2. One side of the fourth power switch S4 is connected to the other side (the anode) of the second auxiliary diode Dx2. The other side of the fourth power switch S4 is connected to the other side (the anode) of the third diode D3 and the other side of the second capacitor 102.

The first filter circuit 21 comprises a first output inductor L1 and a second output inductor L2. One side of the first output inductor L1 is connected between the first power switch S1, the first auxiliary power switch Sx1 and the first diode D1 of the first-converting circuit 11. The other side of the first output inductor L1 is connected between the second auxiliary diode Dx2 and the fourth power switch S4 of the second-converting circuit 12, and is connected to one side of the second output inductor L2. The second filter circuit 22 comprises a third output inductor L3 and a fourth output inductor L4. One side of the third output inductor L3 is connected between the third power switch S3, the second auxiliary power switch Sx2 and the third diode D3 of the second-converting circuit 12. The other side of the third output inductor L3 is connected between the first auxiliary diode Dx1 and the second power switch S2 of the first-converting circuit 11, and is connected to one side of the fourth output inductor L4. The third filter circuit 23 is connected to the alternating-current-output voltage Vac in parallel and comprises a first output capacitor C1 and a second output capacitor C2. One side of the first output capacitor C1 is connected to the middle point Po. The other side of the first output capacitor C1 is connected to the other side of the second output inductor L2. One side of the second output capacitor C2 is connected to the middle point Po. The other side of the second output capacitor C2 is connected to the other side of the fourth output inductor L4.

Moreover, an inductance value of the second output inductor L2 is equal to an inductance value of the fourth output inductor L4. An inductance value of the first output inductor L1 is equal to an inductance value of the third output inductor L3. The inductance value of the second output inductor L2 and the inductance value of the fourth output inductor L4 are greater than the inductance value of the first output inductor L1 and the inductance value of the third output inductor L3. The inductance values of the first output inductor L1, the second output inductor L2, the third output inductor L3 and the fourth output inductor L4 may have following ratio relationship: $L2 \geq 2L1$ and $L4 \geq 2L3$; $L2/L1 = L4/L3 \geq 2$. Moreover, the inductance values of the first output inductor L1, the second output inductor L2, the third output inductor L3 and the fourth output inductor L4 may have error values respectively. The error value within $\pm 20\%$ of the inductance value of the output inductor is more desirable. Moreover, because the inductance value of the second output inductor L2 and the inductance value of the fourth output inductor L4 are greater than the inductance value of the first output inductor L1 and the inductance value of the third output inductor L3, the power conversion system 100 only requires two inductors (L2, L4) having greater inductance values but does not require four large inductors which are required by the related art, so that the whole circuit volume of the power conversion system 100 can be reduced.

Please refer to FIG. 3. Another side of the first output capacitor C1 and the second output capacitor C2 is connected to and outputs the alternating-current-output voltage Vac in parallel and supplies power to the load (not shown in FIG. 3). The control circuit 30 generates a plurality of control signals to separately control the first-converting circuit 11 and the second-converting circuit 12. The description of the operation of the power conversion system 100 is described in detail later.

Figure 4:
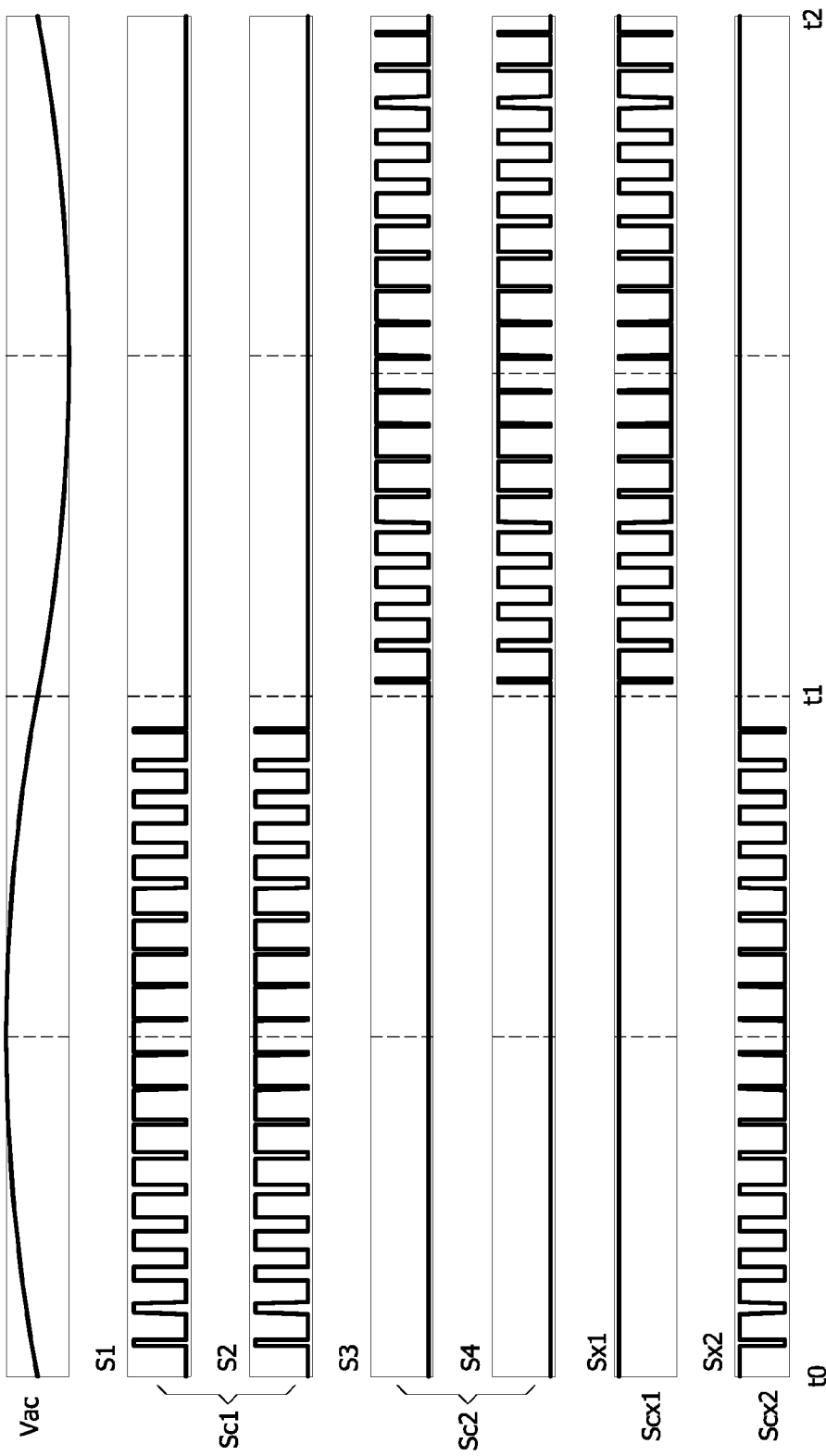
FIG. 4 shows waveform diagrams of control signals for switches of the power conversion system according to an embodiment of the present invention.

FIG. 4 shows waveform diagrams of the control signals for the switches of the power conversion system of the present invention. Please refer to FIG. 3 again. When the alternating-current-output voltage Vac is in the positive half cycle (at the time t0-t1 interval), the first control signal Sc1 is a first pulse width modulation control signal, the second control signal Sc2 is a low level signal, the first auxiliary control signal Scx1 is a high level signal and the second auxiliary control signal Scx2 is a second pulse width modulation control signal which is complementary with the first control signal Sc1. When the alternating-current-output voltage Vac is in the negative half cycle (at the time t1-t2 interval), the first control signal Sc1 is a low level signal, the second control signal Sc2 is a third pulse width modulation control signal, the first auxiliary control signal Scx1 is a fourth pulse width modulation control signal which is complementary with the second control signal Sc2 and the second auxiliary control signal Scx2 is a high level signal. The high level signal and the low level signal mentioned above are just relative high or low to the reference level (in this embodiment, the reference level is 0V). Therefore, the voltage values of the high level signal and the low level signal mentioned above are not limited. Moreover, if the application for the reactive power is not required, when the alternating-current-output voltage Vac is in the positive half cycle (at the time t0-t1 interval), the second auxiliary control signal Scx2 can be maintained as a low level signal as well. Similarly, when the alternating-current-output voltage Vac is in the negative half cycle (at the time t1-t2 interval), the first auxiliary control signal Scx1 can be maintained as a low level signal as well.

Figure 5:
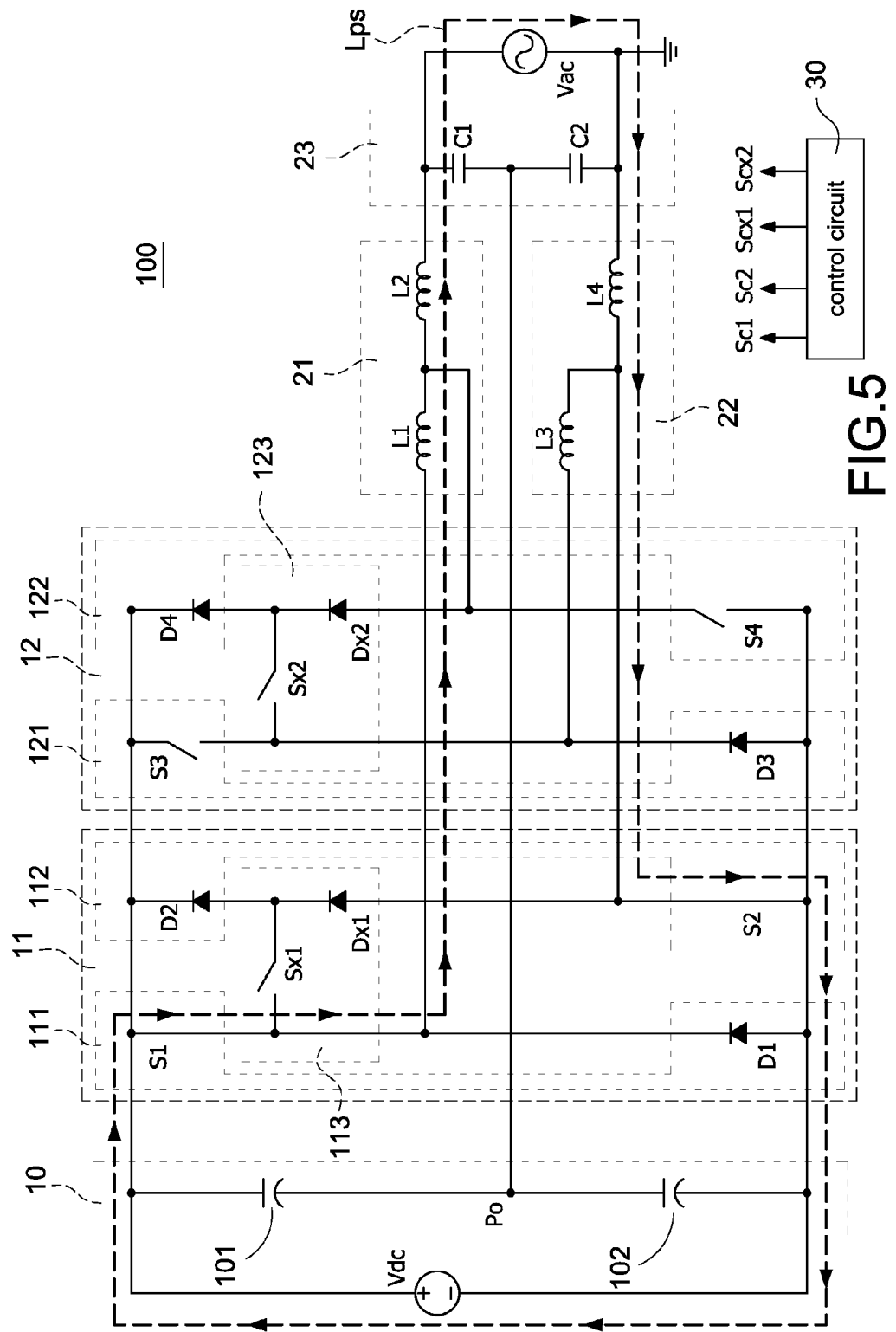
FIG. 5 shows a circuit diagram of the first embodiment of the power conversion system in the positive half cycle energy storage operation.
Figure 6:
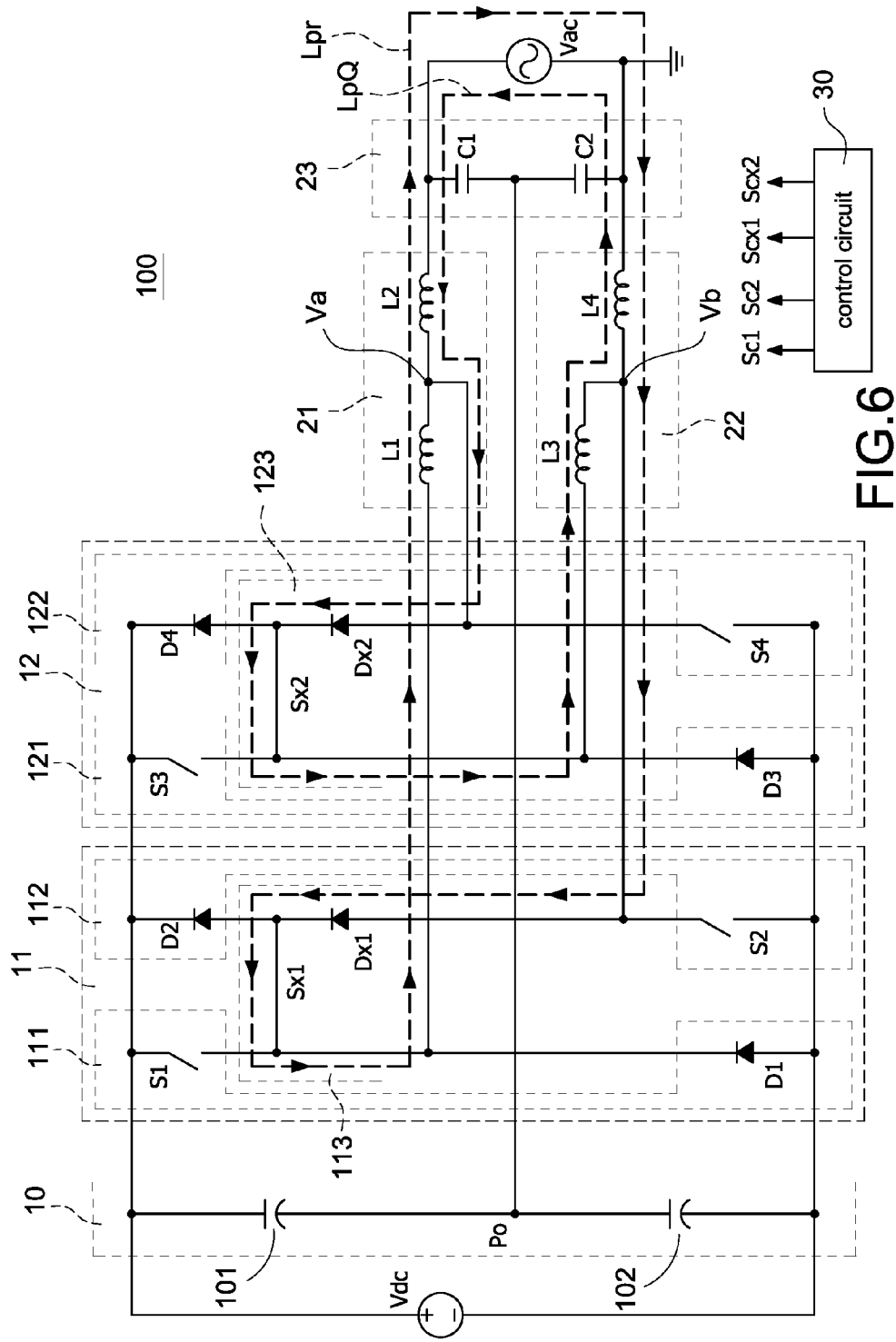
FIG. 6 shows a circuit diagram of the first embodiment of the power conversion system in the positive half cycle energy release operation.

Referring to FIG. 5 and FIG. 6, together with FIGS. 3-4, when the alternating-current-output voltage Vac is operating in the positive half cycle, the power conversion system 100 is configured to provide at least one of: a positive half cycle energy storage loop Lps; a positive half cycle energy release loop Lpr; and a positive half cycle reactive power loop LpQ, wherein the positive half cycle energy storage loop Lps comprises a current flow route through the direct-current-input voltage Vdc, the first power switch S1, the first output inductor L1, the second output inductor L2, the alternating-current-output voltage Vac, the fourth output inductor L4 and the second power switch S2; the positive half cycle energy release loop Lpr comprises a current flow route through the second output inductor L2, the alternating-current-output voltage Vac, the fourth output inductor L4, the first auxiliary diode Dx1, the first auxiliary power switch Sx1, and the first output inductor L1; and the positive half cycle reactive power loop LpQ comprises a current flow route through the alternating-current-output voltage Vac, the second output inductor L2, the second auxiliary diode Dx2, the second auxiliary power switch Sx2, the third output inductor L3, and the fourth output inductor L4.

More particularly, referring to FIG. 5 together with FIGS. 3-4, when the alternating-current-output voltage Vac is operated in the positive half cycle, the first auxiliary control signal Scx1 turns on the first auxiliary power switch Sx1, and when the first control signal Sc1 switches to turn on the first power switch S1 and the second power switch S2, the first filter circuit 21 and the second filter circuit 22 are in an energy storage operation. At this time, a positive half cycle energy storage loop Lps of the power conversion system 100 is formed by the direct-current-input voltage Vdc, the first power switch S1, the first output inductor L1, the second output inductor L2, the alternating-current-output voltage Vac, the fourth output inductor L4 and the second power switch S2, then going back to the direct-current-input voltage Vdc.

Referring to FIG. 6 together with FIGS. 3-4, when the alternating-current-output voltage Vac is operated in the positive half cycle, the first control signal Sc1 turns off the first power switch S1 and the second power switch S2, and when the second auxiliary control signal Scx2 switches to turn on the second auxiliary power switch Sx2, the first filter circuit 21 and the second filter circuit 22 are in an energy release operation. At this time, a positive half cycle energy release loop Lpr of the power conversion system 100 is formed by the second output inductor L2, the alternating-current-output voltage Vac, the fourth output inductor L4, the first auxiliary diode Dx1 and the first auxiliary power switch Sx1, then going back to the first output inductor L1.

Moreover, the load which the alternating-current-output voltage Vac is supplied to is usually a non-pure resistance load. The output power comprises the active power and the reactive power, so that a reactive power loop that the alternating-current-output voltage Vac and the output current are reversed is generated. When the first power switch S1 and the second power switch S2 are turned off, the second auxiliary control signal Scx2 switches to turn on the second auxiliary power switch Sx2 to provide the positive half cycle reactive power loop LpQ formed by the alternating-current-output voltage Vac, the second output inductor L2, the second auxiliary diode Dx2, the second auxiliary power switch Sx2, the third output inductor L3 and the fourth output inductor L4, then going back to the alternating-current-output voltage Vac. When the alternating-current-output voltage Vac and the output current of the power conversion system 100 have the same direction and the power conversion system 100 is in the positive half cycle energy release operation, the loop of the power conversion system 100 is the positive half cycle energy release loop Lpr. Because the inductance values of the first output inductor L1, the second output inductor L2, the third output inductor L3 and the fourth output inductor L4 have the ratio relationship, and the inductance value of the second output inductor L2 and the inductance value of the fourth output inductor L4 are greater than the inductance value of the first output inductor L1 and the inductance value of the third output inductor L3, when the current flows through the first output inductor L1, the second output inductor L2, the third output inductor L3 and the fourth output inductor L4, the voltage across the second output inductor L2 and the fourth output inductor L4 is greater than the voltage across the first output inductor L1 and the third output inductor L3. When the power conversion system 100 is in the positive half cycle energy release loop Lpr, a voltage difference Vab between a voltage Va and a voltage Vb is very small, wherein the voltage Va is at a middle node between the first output inductor L1 and the second output inductor L2, and the voltage Vb is at a middle node between the third output inductor L3 and the fourth output inductor L4. In other words, the positive half cycle energy release loop Lpr cannot shunt to the path of the second auxiliary diode Dx2, the second auxiliary power switch Sx2 and the third output inductor L3, so the loop loss of the power conversion system 100 can be reduced, and the overall efficiency of the power conversion system 100 can be increased. Moreover, when the alternating-current-output voltage Vac and the output current are reversed, the power conversion system 100 can provide the positive half cycle reactive power loop LpQ for the reactive power path as well. Moreover, the efficiency of the present invention can be achieved by the inductance value of the second output inductor L2 and the inductance value of the fourth output inductor L4 being greater than the inductance value of the first output inductor L1 and the inductance value of the third output inductor L3. However, the ratio relationship can be selected to be greater according to the desired requirements, for examples but not limited to, 10 times or 100 times. A person having ordinary skill in the art should understand that the greater ratio results in less loop loss and smaller inductor total volume.

The first auxiliary branch 113 is for when the loop of the power conversion system 100 is in the positive half cycle, the current can flow through the energy release loop but does not return to the direct-current-input voltage Vdc, to reduce the current ripple. Therefore, the first auxiliary power switch Sx1 is not limited to have to be connected between the first power switch S1 and the second diode D2, and the first auxiliary diode Dx1 is not limited to have to be connected between the second diode D2 and the second power switch S2. For example, the first auxiliary power switch Sx1 can be connected between the first power switch S1 and the first diode D1, and the first auxiliary diode Dx1 can be connected between the first power switch S1 and the second diode D2. Therefore, any embodiment that provides the energy release loop when the loop of the power conversion system 100 is in the positive half cycle is envisaged by the present invention. To avoid confusion of the description of the embodiments of the present invention, the selected known structure and function are not shown or described in details.

Figure 7:
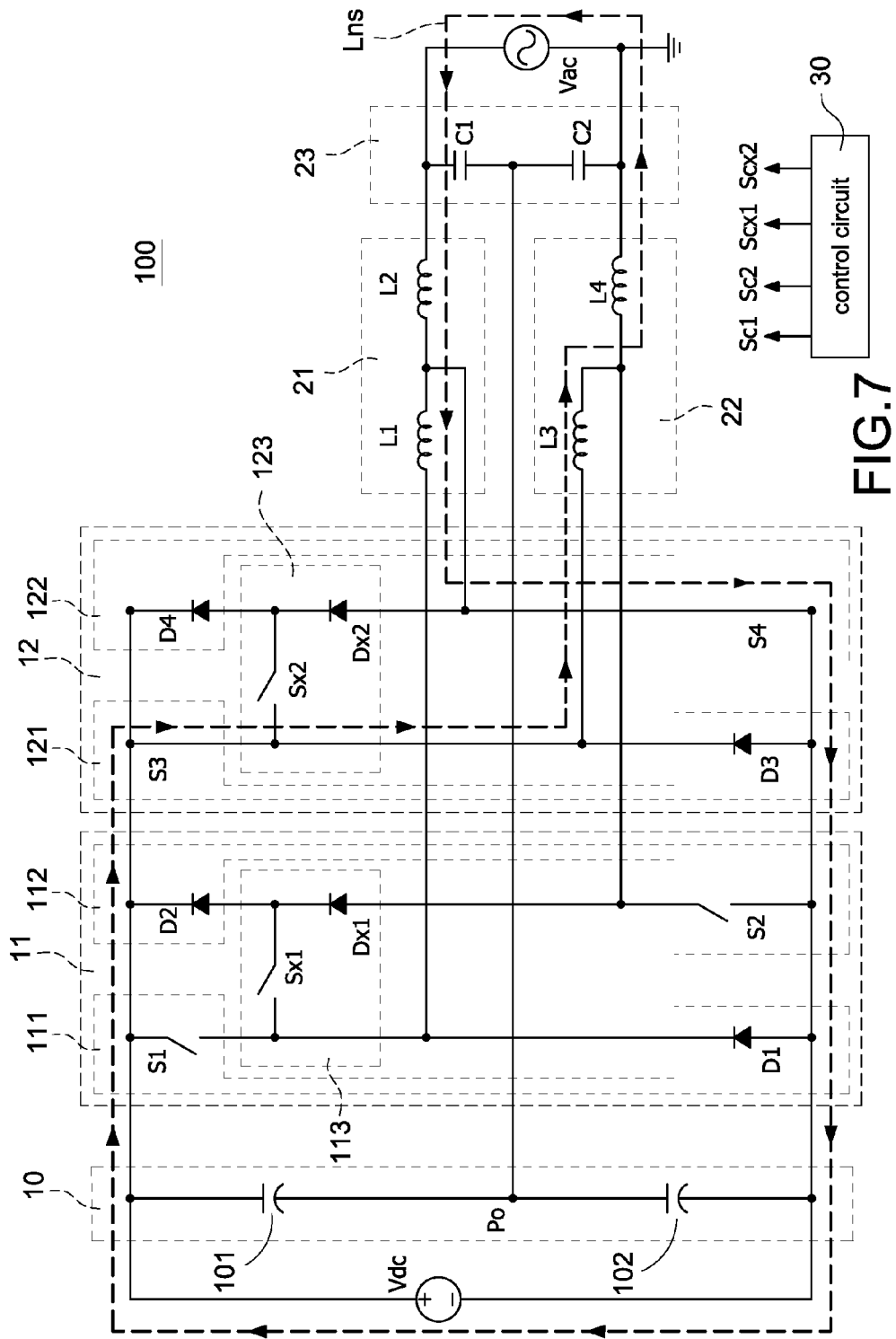
FIG. 7 shows a circuit diagram of the first embodiment of the power conversion system in the negative half cycle energy storage operation.
Figure 8:
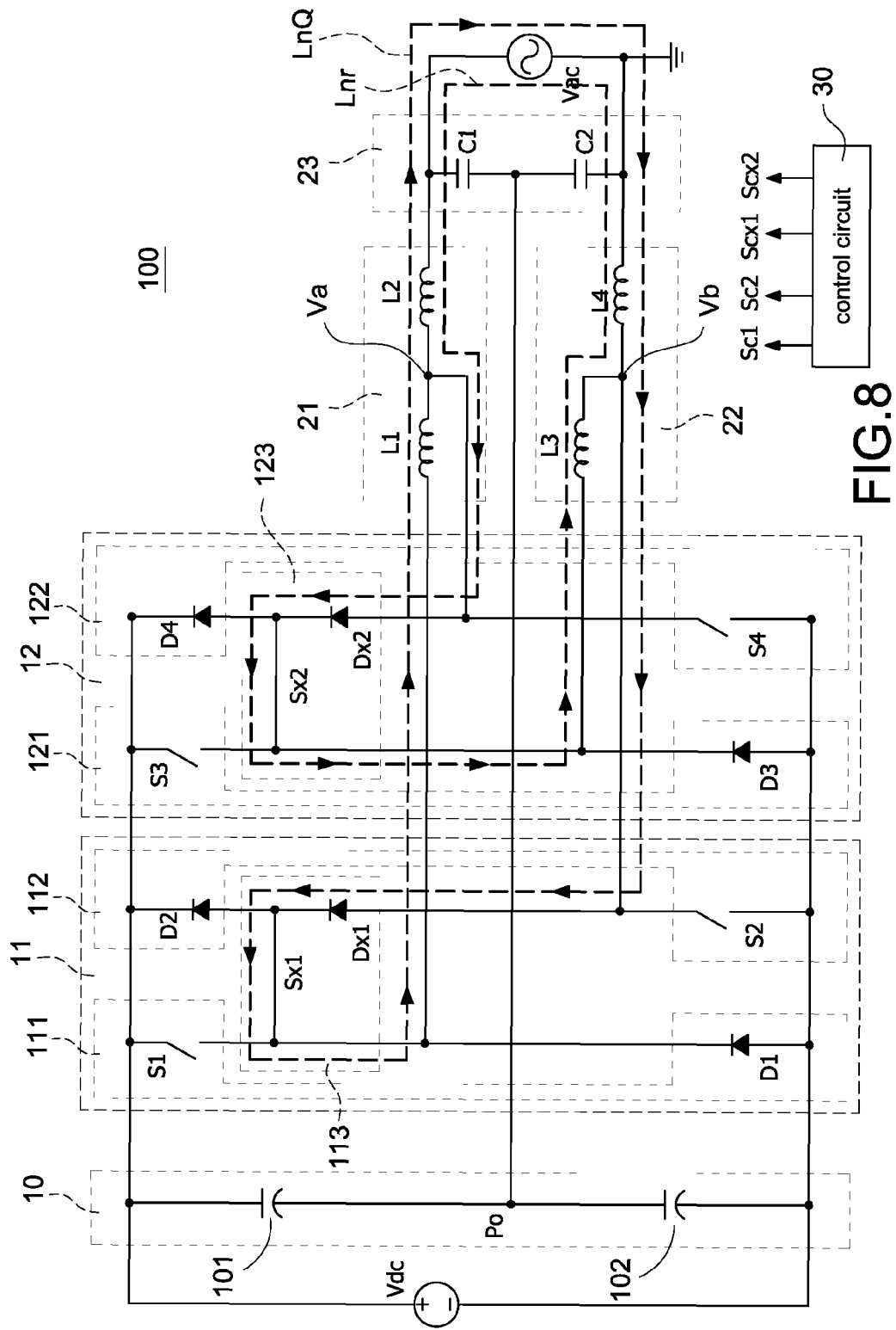
FIG. 8 shows a circuit diagram of the first embodiment of the power conversion system in the negative half cycle energy release operation.

Referring to FIG. 7 and FIG. 8, together with FIGS. 3-4, when the alternating-current-output voltage is operating in the negative half cycle, the power conversion system 100 is configured to provide at least one of: a negative half cycle energy storage loop Lns; a negative half cycle energy release loop Lnr; and a negative half cycle reactive power loop LnQ, wherein the negative half cycle energy storage loop Lns comprises a current flow through direct-current-input voltage Vdc, the third power switch S3, the third output inductor L3, the fourth output inductor L4, the alternating-current-output voltage Vac, the second output inductor L2, and the fourth power switch S4; the negative half cycle energy release loop Lnr comprises a current flow through the fourth output inductor L4, the alternating-current-output voltage Vac, the second output inductor L2, the second auxiliary diode Dx2, the second auxiliary power switch Sx2, and the third output inductor L3; and the negative half cycle reactive power loop LnQ comprises a current flow through the alternating-current-output voltage Vac, the fourth output inductor L4, the first auxiliary diode Dx1, the first auxiliary power switch Sx1, the first output inductor L1 and the second output inductor L2.

More particularly, referring to FIG. 7 together with FIGS. 3-4, when the alternating-current-output voltage Vac is operated in the negative half cycle, the second auxiliary control signal Scx2 turns on the second auxiliary power switch Sx2, and when the second control signal Sc2 switches to turn on the third power switch S3 and the fourth power switch S4, the first filter circuit 21 and the second filter circuit 22 are in the energy storage operation. At this time, a negative half cycle energy storage loop Lns of the power conversion system 100 is formed by the direct-current-input voltage Vdc, the third power switch S3, the third output inductor L3, the fourth output inductor L4, the alternating-current-output voltage Vac, the second output inductor L2 and the fourth power switch S4, then going back to the direct-current-input voltage Vdc.

Referring to FIG. 8 together with FIGS. 3-4, when the alternating-current-output voltage Vac is operated in the negative half cycle, the second control signal Sc2 turns off the third power switch S3 and the fourth power switch S4, and when the first auxiliary control signal Scx1 switches to turn on the first auxiliary power switch Sx1, the first filter circuit 21 and the second filter circuit 22 are in the energy release operation. At this time, a negative half cycle energy release loop Lnr of the power conversion system 100 is formed by the fourth output inductor L4, the alternating-current-output voltage Vac, the second output inductor L2, the second auxiliary diode Dx2, the second auxiliary power switch Sx2 and the third output inductor L3, then going back to the fourth output inductor L4. Moreover, when the alternating-current-output voltage Vac and the output current of the power conversion system 100 have the same direction and the power conversion system 100 is in the negative half cycle energy release operation, the loop of the power conversion system 100 is the negative half cycle energy release loop Lnr. The voltage difference Vab between the voltage Va and the voltage Vb is very small, wherein the voltage Va is at the middle node between the first output inductor L1 and the second output inductor L2, and the voltage Vb is at the middle node between the third output inductor L3 and the fourth output inductor L4. In another word, the negative half cycle energy release loop Lnr cannot shunt to the path of the first auxiliary diode Dx1, the first auxiliary power switch Sx1 and the first output inductor L1, so the loop loss of the power conversion system 100 can be reduced, and the overall efficiency of the power conversion system 100 can be increased. Moreover, when the alternating-current-output voltage Vac and the output current are reversed, and the third power switch S3 and the fourth power switch S4 are turned off, the first auxiliary control signal Scx1 switches to turn on the first auxiliary power switch Sx1 to provide a negative half cycle reactive power loop LnQ formed by the alternating-current-output voltage Vac, the fourth output inductor L4, the first auxiliary diode Dx1, the first auxiliary power switch Sx1, the first output inductor L1 and the second output inductor L2, then going back to the alternating-current-output voltage Vac.

The second auxiliary branch 123 is for when the loop of the power conversion system 100 is in the negative half cycle, the current can flow through the energy release loop but does not return to the direct-current-input voltage Vdc, to reduce the current ripple. Therefore, the second auxiliary power switch Sx2 is not limited to have to be connected between the third power switch S3 and the fourth diode D4, and the second auxiliary diode Dx2 is not limited to have to be connected between the fourth diode D4 and the fourth power switch S4. For example, the second auxiliary power switch Sx2 can be connected between the third power switch S3 and the third diode D3, and the second auxiliary diode Dx2 can be connected between the third power switch S3 and the fourth diode D4. Therefore, any embodiment that provides the energy release loop when the loop of the power conversion system 100 is in the negative half cycle is envisaged in the present invention. To avoid confusion of the description of the embodiments of the present invention, the selected known structure and function are not shown or described in details.

Figure 9:
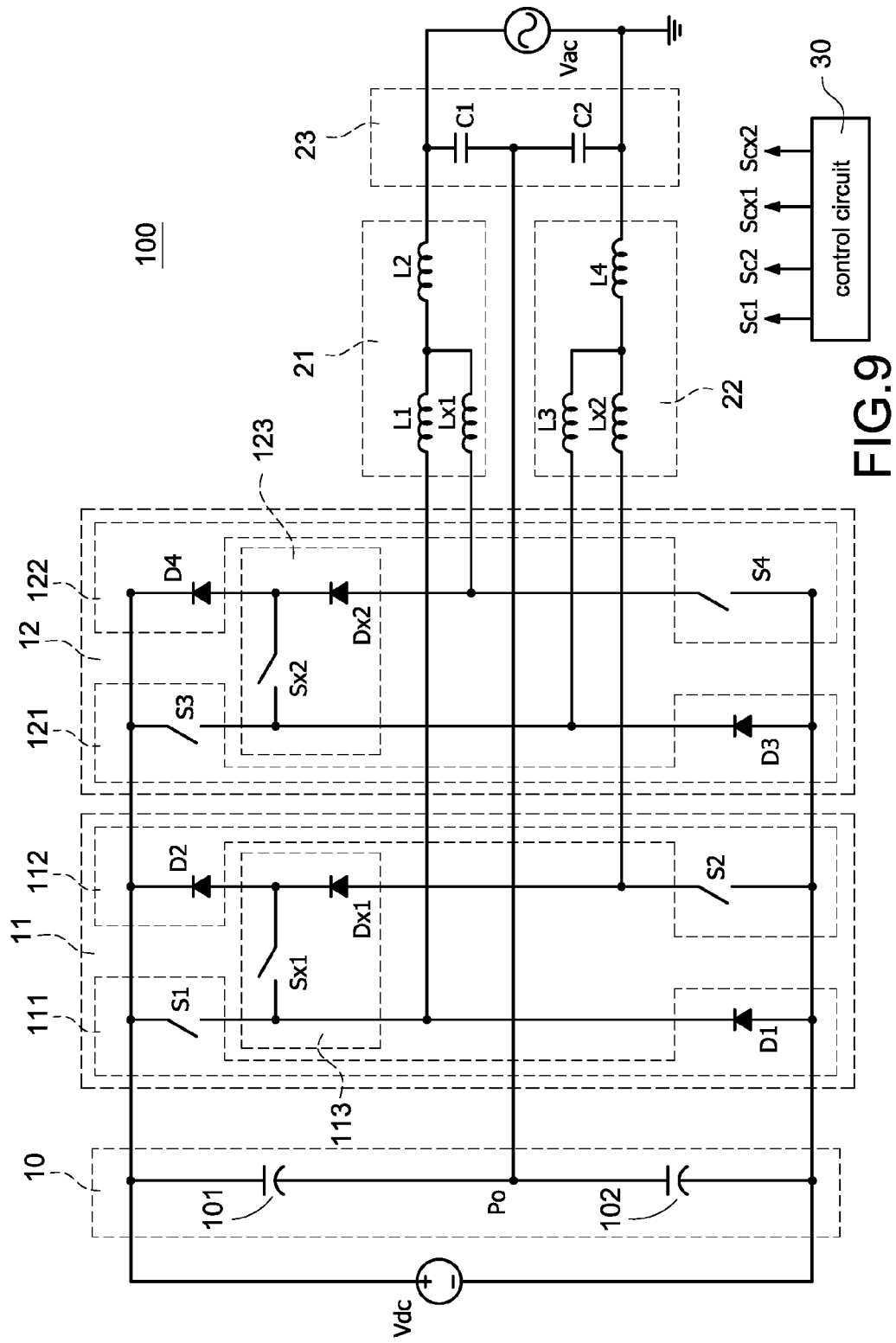
FIG. 9 shows a circuit diagram of a second embodiment of the power conversion system of the present invention.

Referring to FIG. 9, the difference between the embodiment shown and the abovementioned embodiment (shown in FIG. 3) is that the number of the inductors of the first filter circuit 21 and the second filter circuit 22 is different and the connection relationship is also different. The description of the circuit structures and connections of the input capacitor group 10, the first-converting circuit 11, the second-converting circuit 12, the third filter circuit 23 and the control circuit 30 of the power conversion system 100 is the same as FIG. 3 and are not repeated here for brevity. The first filter circuit 21 comprises a first output inductor L1, a second output inductor L2 and a first freewheeling inductor Lx1. One side of the first output inductor L1 is connected between the first power switch S1, the first auxiliary power switch Sx1 and the first diode D1 of the first-converting circuit 11. The other side of the first output inductor L1 is connected to one side of the first freewheeling inductor Lx1 and one side of the second output inductor L2. The other side of the first freewheeling inductor Lx1 is connected between the second auxiliary diode Dx2 and the fourth power switch S4 of the second-converting circuit 12. The second filter circuit 22 comprises a third output inductor L3, a fourth output inductor L4 and a second freewheeling inductor Lx2. One side of the third output inductor L3 is connected between the third power switch S3, the second auxiliary power switch Sx2 and the third diode D3 of the second-converting circuit 12. The other side of the third output inductor L3 is connected to one side of the second freewheeling inductor Lx2 and one side of the fourth output inductor L4. The other side of the second freewheeling inductor Lx2 is connected between the first auxiliary diode Dx1 and the second power switch S2 of the first-converting circuit 11.

An inductance value of the second output inductor L2 is equal to an inductance value of the fourth output inductor L4. An inductance value of the first output inductor L1 and an inductance value of the first freewheeling inductor Lx1 are equal to an inductance value of the third output inductor L3 and an inductance value of the second freewheeling inductor Lx2. The inductance value of the second output inductor L2 and the inductance value of the fourth output inductor L4 are greater than the inductance value of the first output inductor L1, the inductance value of the third output inductor L3, the inductance value of the first freewheeling inductor Lx1 and the inductance value of the second freewheeling inductor Lx2. In one embodiment, the inductance value of the second output inductor is at least two times larger than the inductance value of the first output inductor and the inductance value of the first freewheeling inductor; and the inductance value of the fourth output inductor is at least two times larger than the inductance value of the third output inductor and the inductance value of the second freewheeling inductor. Further, the inductance values of the first output inductor L1, the second output inductor L2, the third output inductor L3, the fourth output inductor L4, the first freewheeling inductor Lx1 and the second freewheeling inductor Lx2 may have following ratio relationship: L2/L1=L2/Lx1=L4/L3=L4/Lx2≥2. Moreover, the inductance values of the first output inductor L1, the second output inductor L2, the third output inductor L3, the fourth output inductor L4, the first freewheeling inductor Lx1 and the second freewheeling inductor Lx2 may have error values respectively. The error value within ±20% of the inductance value of the output inductor is more desirable. Moreover, because the inductance value of the second output inductor L2 and the inductance value of the fourth output inductor L4 are greater than the inductance value of the first output inductor L1, the inductance value of the third output inductor L3, the inductance value of the first freewheeling inductor Lx1 and the inductance value of the second freewheeling inductor Lx2, the power conversion system 100 only requires two inductors (L2, L4) having greater inductance values but does not require four large inductors which are required by the related art, so that the whole circuit volume of the power conversion system 100 can be reduced.

Referring to FIG. 9 together with FIG. 4, although the number of the inductors of the first filter circuit 21 and the second filter circuit 22 is different and the connection relationship is also different, the efficiency of the circuit operation can be achieved by the corresponding control of the first control signal Sc1, the second control signal Sc2, the first auxiliary control signal Scx1 and the second auxiliary control signal Scx2. Detailed descriptions in this respect are not repeated for brevity.

When the alternating-current-output voltage is operating in the positive half cycle, the power conversion system is configured to provide at least one of: a positive half cycle energy storage loop; a positive half cycle energy release loop; and a positive half cycle reactive power loop, wherein the positive half cycle energy storage loop of the power conversion system comprises a current flow route through the direct-current-input voltage, the first power switch, the first output inductor, the second output inductor, the alternating-current-output voltage, the fourth output inductor, the second freewheeling inductor, and the second power switch; the positive half cycle energy release loop of the power conversion system comprises a current flow route through the second output inductor, the alternating-current-output voltage, the fourth output inductor, the second freewheeling inductor, the first auxiliary diode, the first auxiliary power switch, and the first output inductor; and the positive half cycle reactive power loop comprises a current flow route through the alternating-current-output voltage, the second output inductor, the first freewheeling inductor, the second auxiliary diode, the second auxiliary power switch, the third output inductor, and the fourth output inductor.

When the alternating-current-output voltage is operating in the negative half cycle, the power conversion system is configured to provide at least one of: a negative half cycle energy storage loop; a negative half cycle energy release loop; and a negative half cycle reactive power loop, wherein the negative half cycle energy storage loop of the power conversion system comprises a current flow through the direct-current-input voltage, the third power switch, the third output inductor, the fourth output inductor, the alternating-current-output voltage, the second output inductor, the first freewheeling inductor, and the fourth power switch; the negative half cycle energy release loop comprises a current flow through the fourth output inductor, the alternating-current-output voltage, the second output inductor, the first freewheeling inductor, the second auxiliary diode, the second auxiliary power switch, and the third output inductor; and the negative half cycle reactive power loop comprises a current flow through the alternating-current-output voltage, the fourth output inductor, the second freewheeling inductor, the first auxiliary diode, the first auxiliary power switch, the first output inductor, and the second output inductor.

Figure 10:
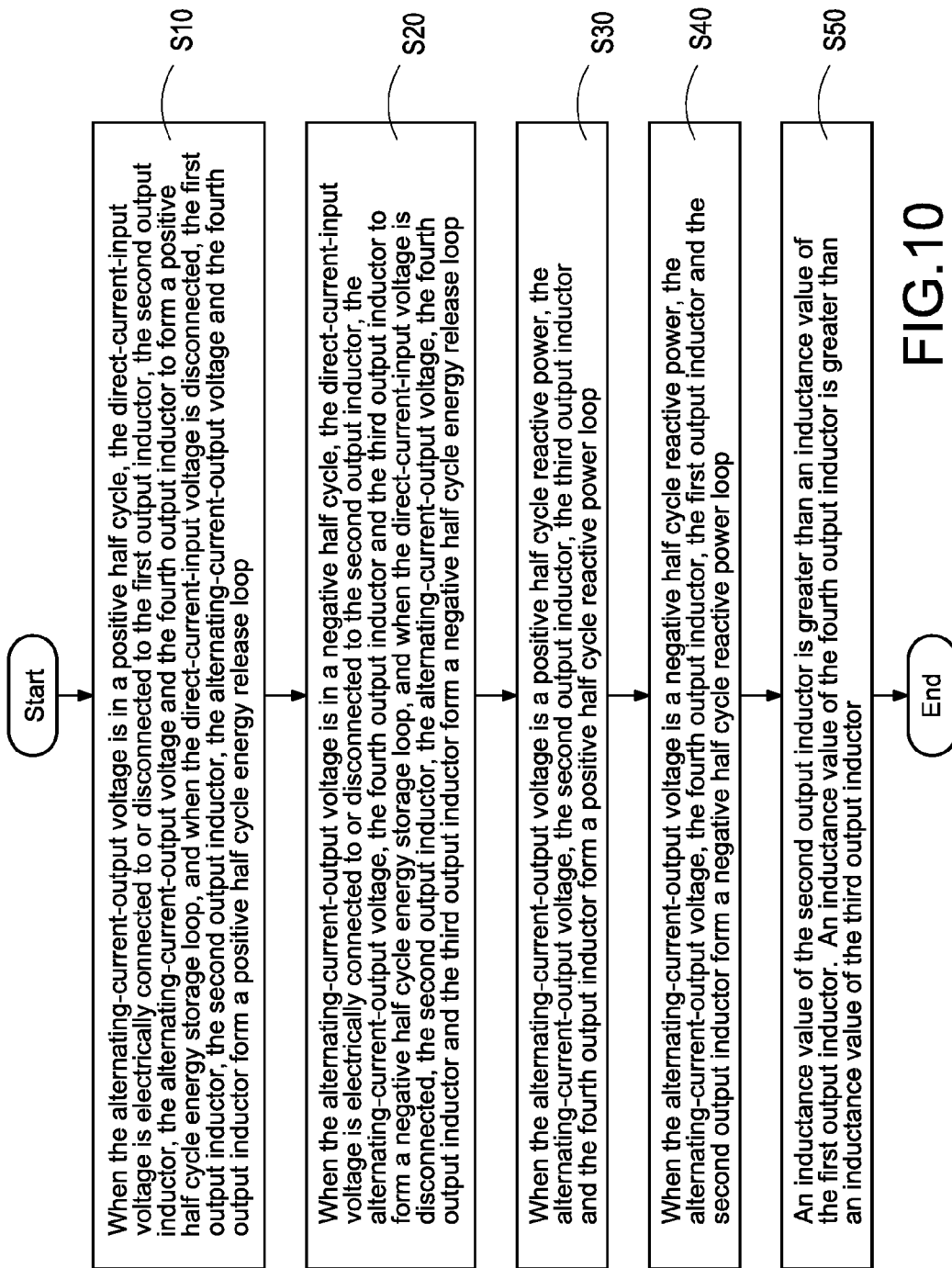
FIG. 10 shows a flow chart of an operation method for the power conversion system according to an embodiment of the present invention.

Referring to FIG. 10 together with FIGS. 3-8, the power conversion system 100 converts a direct-current-input voltage Vdc into an alternating-current-output voltage Vac. The power conversion system 100 includes a first filter circuit 21 and a second filter circuit 22. The first filter circuit 21 includes a first output inductor L1 and a second output inductor L2. The second filter circuit 22 includes a third output inductor L3 and a fourth output inductor L4. One side of the first output inductor L1 is connected to a first-converting circuit 11. The other side of the first output inductor L1 is connected to a second-converting circuit 12 and one side of the second output inductor L2. One side of the third output inductor L3 is connected to the second-converting circuit 12. The other side of the third output inductor L3 is connected to the first-converting circuit 11 and one side of the fourth output inductor L4. Moreover, according to the control signals (Sc1, Sc2, Scx1, Scx2) output by the control circuit 30, the first-converting circuit 11 and the second-converting circuit 12 switch and change the connection relationships of the direct-current-input voltage Vdc with the first output inductor L1, the second output inductor L2, the third output inductor L3 and the fourth output inductor L4.

As shown in FIG. 10, the operation method comprises following steps: First, when the alternating-current-output voltage Vac is in a positive half cycle, the direct-current-input voltage Vdc is electrically connected to or disconnected to (namely, switched on/off) the first output inductor L1, the second output inductor L2, the alternating-current-output voltage Vac and the fourth output inductor L4 to form a positive half cycle energy storage loop Lps, and when the direct-current-input voltage Vdc is disconnected, the first output inductor L1, the second output inductor L2, the alternating-current-output voltage Vac and the fourth output inductor L4 form a positive half cycle energy release loop Lpr (S10). Then, when the alternating-current-output voltage Vac is in a negative half cycle, the direct-current-input voltage Vdc is electrically connected to or disconnected to (namely, switched on/off) the second output inductor L2, the alternating-current-output voltage Vac, the fourth output inductor L4 and the third output inductor L3 to form a negative half cycle energy storage loop Lns, and when the direct-current-input voltage Vdc is disconnected, the second output inductor L2, the alternating-current-output voltage Vac, the fourth output inductor L4 and the third output inductor L3 form a negative half cycle energy release loop Lnr (S20).

Then, when the alternating-current-output voltage Vac is a positive half cycle reactive power, the alternating-current-output voltage Vac, the second output inductor L2, the third output inductor L3 and the fourth output inductor L4 form a positive half cycle reactive power loop LpQ (S30). Then, when the alternating-current-output voltage Vac is a negative half cycle reactive power, the alternating-current-output voltage Vac, the fourth output inductor L4, the first output inductor L1 and the second output inductor L2 form a negative half cycle reactive power loop LnQ (S40). Further, an inductance value of the second output inductor L2 is defined as greater than an inductance value of the first output inductor L1, and an inductance value of the fourth output inductor L4 is defined as greater than an inductance value of the third output inductor L3 (S50). Therefore, when the alternating-current-output voltage Vac and the output current of the power conversion system 100 have the same direction or are in reverse, only one single path is included to reduce the loop loss of the power conversion system 100 and increase the overall efficiency of the power conversion system 100.

Figure 11:
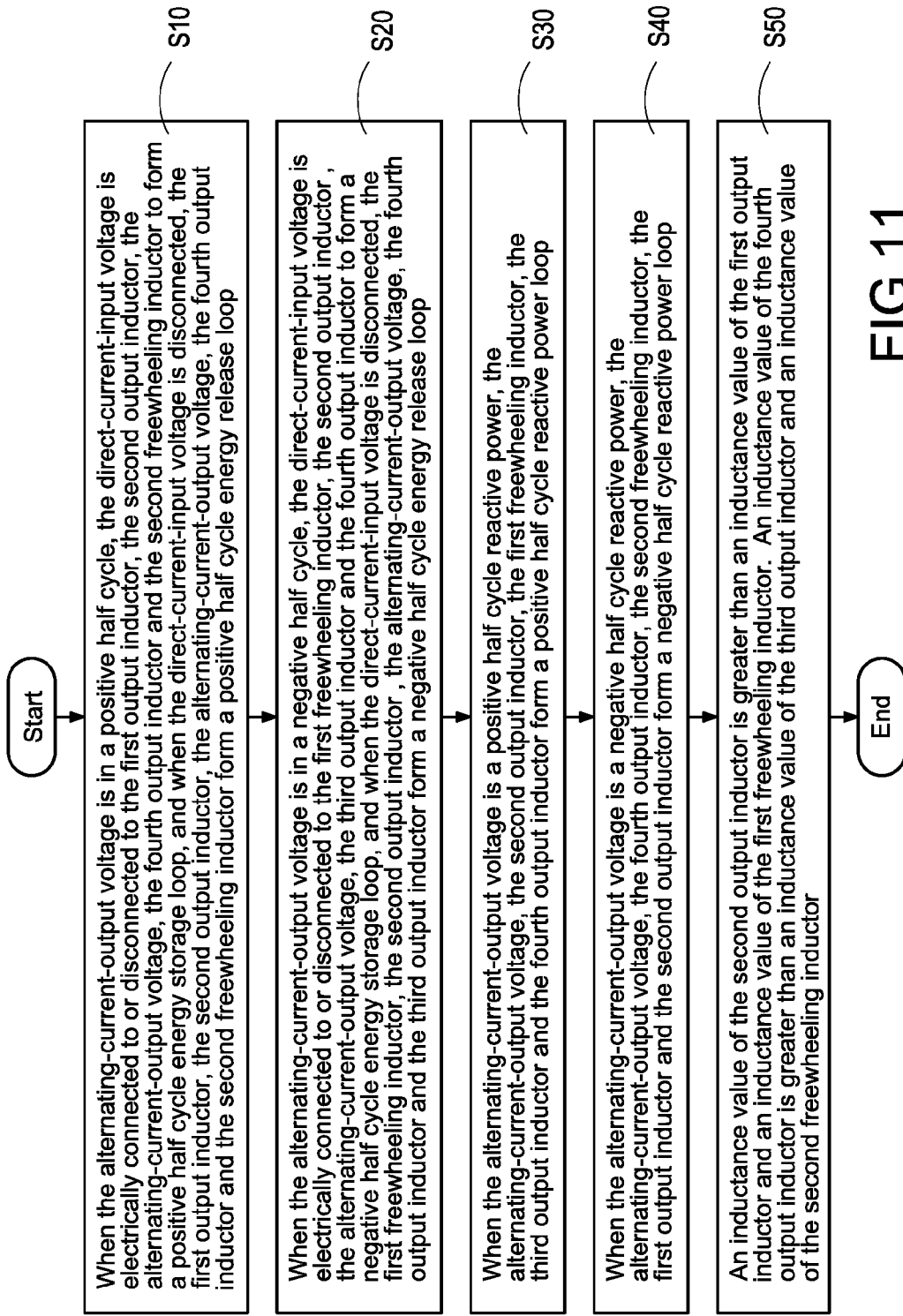
FIG. 11 shows a flow chart of an operation method for the power conversion system according to another embodiment of the present invention.

Referring to FIG. 11 together with FIGS. 4 and 9, the first filter circuit 21 comprises a first output inductor L1, a second output inductor L2 and a first freewheeling inductor Lx1. One side of the first output inductor L1 is connected to the first-converting circuit 11. The other side of the first output inductor L1 is connected to one side of the first freewheeling inductor Lx1 and one side of the second output inductor L2. The other side of the first freewheeling inductor Lx1 is connected to the second-converting circuit 12. The second filter circuit 22 comprises a third output inductor L3, a fourth output inductor L4 and a second freewheeling inductor Lx2. One side of the third output inductor L3 is connected to the second-converting circuit 12. The other side of the third output inductor L3 is connected to one side of the second freewheeling inductor Lx2 and one side of the fourth output inductor L4. The other side of the second freewheeling inductor Lx2 is connected to the second-converting circuit 12.

As shown in FIG. 11, the operation method comprises following steps: First, when the alternating-current-output voltage Vac is in a positive half cycle, the direct-current-input voltage Vdc is electrically connected to or disconnected to (namely, switched on/off) the first output inductor L1, the second output inductor L2, the alternating-current-output voltage Vac, the fourth output inductor L4 and the second freewheeling inductor Lx2 to form a positive half cycle energy storage loop Lps (Lps route similar as shown in FIG. 5), and when the direct-current-input voltage Vdc is disconnected, the first output inductor L1, the second output inductor L2, the alternating-current-output voltage Vac, the fourth output inductor L4 and the second freewheeling inductor Lx2 form a positive half cycle energy release loop Lpr (Lpr route similar as shown in FIG. 6) (S10). Then, when the alternating-current-output voltage Vac is in a negative half cycle, the direct-current-input voltage Vdc is electrically connected to or disconnected to (namely, switched on/off) the first freewheeling inductor Lx1, the second output inductor L2, the alternating-current-output voltage Vac, the third output inductor L3 and the fourth output inductor L4 to form a negative half cycle energy storage loop Lns (Lns route similar as shown in FIG. 7), and when the direct-current-input voltage Vdc is disconnected, the first freewheeling inductor Lx1, the second output inductor L2, the alternating-current-output voltage Vac, the fourth output inductor L4 and the third output inductor L3 form a negative half cycle energy release loop Lnr (Lnr route similar as shown in FIG. 8) (S20).

When the alternating-current-output voltage Vac is a positive half cycle reactive power, the alternating-current-output voltage Vac, the second output inductor L2, the first freewheeling inductor Lx1, the third output inductor L3 and the fourth output inductor L4 form a positive half cycle reactive power loop LpQ (LpQ route similar as shown in FIG. 6) (S30). Then, when the alternating-current-output voltage Vac is a negative half cycle reactive power, the alternating-current-output voltage Vac, the fourth output inductor L4, the second freewheeling inductor Lx2, the first output inductor L1 and the second output inductor L2 form a negative half cycle reactive power loop LnQ (LnQ route similar as shown in FIG. 8) (S40). Further, an inductance value of the second output inductor L2 is defined as greater than an inductance value of the first output inductor L1 and an inductance value of the first freewheeling inductor Lx1, and an inductance value of the fourth output inductor L4 is defined as greater than an inductance value of the third output inductor L3 and an inductance value of the second freewheeling inductor Lx2 (S50). Similar to the previous described embodiment, when the output power of the power conversion system 100 of this embodiment is the active power or the reactive power, only one single path is included to reduce the loop loss of the power conversion system 100 and increase the overall efficiency of the power conversion system 100.

In summary, the following features and advantages may be attained.

(1) The freewheeling features of the first branch 111, the second branch 112, the third branch 121, the fourth branch 122, the first auxiliary branch 113 and the second auxiliary branch 123 are utilized to achieve the efficiency of reducing the current ripple.

(2) The features of the complementary switching of the first power switch S1, the second power switch S2 and the second auxiliary power switch Sx2; and the features of the complementary switching of the third power switch S3, the fourth power switch S4 and the first auxiliary power switch Sx1, are utilized to provide the reactive power path for the output power comprising the reactive power.

(3) According to the dual-buck inverter structure comprising the first-converting circuit 11, the second-converting circuit 12, the first filter circuit 21 and the second filter circuit 22, the energy storage loop and the energy release loop comprising the first output inductor L1, the second output inductor L2, the third output inductor L3, the fourth output inductor L4, the first freewheeling inductor Lx1 and the second freewheeling inductor Lx2 are provided to achieve that when the alternating-current-output voltage Vac and the output current of the power conversion system 100 have the same direction or are reversed, only one single path is included to reduce the loop loss of the power conversion system 100 and increase the overall efficiency of the power conversion system 100.

(4) By using only two inductors (L2, L4) having greater inductance values, the efficiency of reducing the whole circuit volume of the power conversion system 100 can be achieved.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power conversion system for converting a direct-current-input voltage to an alternating-current-output voltage, the power conversion system comprising:
    a first-converting circuit configured to receive the direct-current-input voltage;
    a second-converting circuit connected to the first-converting circuit in parallel;
    a first filter circuit comprising a first output inductor and a second output inductor;
    a second filter circuit comprising a third output inductor and a fourth output inductor;
    a third filter circuit connected to one side of the second output inductor and one side of the fourth output inductor; and
    a control circuit configured to generate a plurality of control signals to separately control the first-converting circuit and the second-converting circuit,
    wherein the one side of the first output inductor is connected to the first-converting circuit; the other side of the first output inductor is connected to the second-converting circuit and the other side of the second output inductor; one side of the third output inductor is connected to the second-converting circuit; the other side of the third output inductor is connected to the first-converting circuit and the other side of the fourth output inductor, and wherein
    an inductance value of the second output inductor is greater than an inductance value of the first output inductor; and an inductance value of the fourth output inductor is greater than an inductance value of the third output inductor;
    wherein the first-converting circuit comprises a first branch, a second branch, and a first auxiliary branch, wherein the first auxiliary branch is connected between the first branch and the second branch; the other side of the fourth output inductor is connected to the first auxiliary branch;
    wherein the second-converting circuit comprises a third branch, a fourth branch, and a second auxiliary branch, wherein the second auxiliary branch is connected between the third branch and the fourth branch; the other side of the second output inductor is connected to the second auxiliary branch.

2. The power conversion system of claim 1, wherein the inductance value of the second output inductor is at least two times larger than the inductance value of the first output inductor; and the inductance value of the fourth output inductor is at least two times larger than the third output inductor.

3. The power conversion system of claim 1 further comprising:
    an input capacitor group configured to receive the direct-current-input voltage, the input capacitor group comprising a first capacitor and a second capacitor, the first capacitor and the second capacitor being connected to each other at a middle point,
    wherein the third filter circuit comprises a first output capacitor and a second output capacitor, wherein one side of the first output capacitor is connected to the middle point and the other side of the first output capacitor is connected to the other side of the second output inductor, and wherein one side of the second output capacitor is connected to the middle point and the other side of the second output capacitor is connected to the other side of the fourth output inductor.

4. The power conversion system of claim 1, wherein the first branch comprises a first power switch connected to a first diode, wherein the second branch comprises a second power switch connected to a second diode, wherein the first auxiliary branch comprises a first auxiliary power switch connected to a first auxiliary diode, and wherein the control circuit is configured to generate a first control signal to control the first power switch and the second power switch, and further configured to generate a first auxiliary control signal to control the first auxiliary power switch.

5. The power conversion system of claim 4, wherein the third branch comprises a third power switch connected to a third diode, wherein the fourth branch comprises a fourth power switch connected to a fourth diode, wherein the second auxiliary branch comprises a second auxiliary power switch connected to a second auxiliary diode, and wherein the control circuit is configured to generate a second control signal to control the third power switch and the fourth power switch, and further configured to generate a second auxiliary control signal to control the second auxiliary power switch.

6. The power conversion system of claim 5, wherein the one side of the first output inductor is connected to the first power switch, the first auxiliary power switch, and the first diode, wherein the other side of the first output inductor is connected to the fourth power switch and the second auxiliary diode, wherein the one side of the third output inductor is connected to the third power switch, the second auxiliary power switch and the third diode, and wherein the other side of the third output inductor is connected to the second power switch and the first auxiliary diode.

7. The power conversion system of claim 6, wherein when the alternating-current-output voltage is in a positive half cycle, the first control signal is a first pulse width modulation control signal; the second control signal is a low level signal; the first auxiliary control signal is a high level signal; and the second auxiliary control signal is a second pulse width modulation control signal, and wherein when the alternating-current-output voltage is in a negative half cycle, the first control signal is a low level signal; the second control signal is a third pulse width modulation control signal; the first auxiliary control signal is a fourth pulse width modulation control signal; and the second auxiliary control signal is a high level signal.

8. The power conversion system of claim 7, wherein when the alternating-current-output voltage is operating in the positive half cycle, the power conversion system is configured to provide at least one of: a positive half cycle energy storage loop; a positive half cycle energy release loop; and a positive half cycle reactive power loop, wherein the positive half cycle energy storage loop comprises a current flow route through the direct-current-input voltage, the first power switch, the first output inductor, the second output inductor, the alternating-current-output voltage, the fourth output inductor and the second power switch;

the positive half cycle energy release loop comprises a current flow route through the second output inductor, the alternating-current-output voltage, the fourth output inductor, the first auxiliary diode, the first auxiliary power switch, and the first output inductor; and the positive half cycle reactive power loop comprises a current flow route through the alternating-current-output voltage, the second output inductor, the second auxiliary diode, the second auxiliary power switch, the third output inductor, and the fourth output inductor.

9. The power conversion system of claim 7, wherein when the alternating-current-output voltage is operating in the negative half cycle, the power conversion system is configured to provide at least one of: a negative half cycle energy storage loop; a negative half cycle energy release loop; and a negative half cycle reactive power loop, wherein the negative half cycle energy storage loop comprises a current flow through direct-current-input voltage, the third power switch, the third output inductor, the fourth output inductor, the alternating-current-output voltage, the second output inductor, and the fourth power switch;

the negative half cycle energy release loop comprises a current flow through the fourth output inductor, the alternating-current-output voltage, the second output inductor, the second auxiliary diode, the second auxiliary power switch, and the third output inductor; and the negative half cycle reactive power loop comprises a current flow through the alternating-current-output voltage, the fourth output inductor, the first auxiliary diode, the first auxiliary power switch, the first output inductor, and the second output inductor.

10. A power conversion system for converting a direct-current-input voltage to an alternating-current-output voltage, the power conversion system comprising:

a first-converting circuit configured to receive the direct-current-input voltage;

a second-converting circuit connected to the first-converting circuit in parallel;

a first filter circuit comprising a first output inductor, a second output inductor, and a first freewheeling inductor;

a second filter circuit comprising a third output inductor, a fourth output inductor, and a second freewheeling inductor;

a third filter circuit connected to one side of the second output inductor and one side of the fourth output inductor; and a control circuit configured to generate a plurality of control signals to separately control the first-converting circuit and the second-converting circuit, wherein the one side of the first output inductor is connected to the first-converting circuit; the other side of the first output inductor is connected to one side of the first freewheeling inductor and the other side of the second output inductor; the other side of the first freewheeling inductor is connected to the second-converting circuit; one side of the third output inductor is connected to the second-converting circuit; the other side of the third output inductor is connected to one side of the second freewheeling inductor and the other side of the fourth output inductor; the other side of the second freewheeling inductor is connected to the first-converting circuit, and wherein an inductance value of the second output inductor is greater than an inductance value of the first output inductor and an inductance value of the first freewheeling inductor; and an inductance value of the fourth output inductor is greater than an inductance value of the third output inductor and an inductance value of the second freewheeling inductor;

wherein the first-converting circuit comprises a first branch, a second branch, and a first auxiliary branch, wherein the first auxiliary branch is connected between the first branch and the second branch; the other side of the fourth output inductor is connected to the first auxiliary branch through the second freewheeling inductor;

wherein the second-converting circuit comprises a third branch, a fourth branch, and a second auxiliary branch, wherein the second auxiliary branch is connected between the third branch and the fourth branch; the other side of the second output inductor is connected to the second auxiliary branch through the first freewheeling inductor.

11. The power conversion system of claim 10, wherein the inductance value of the second output inductor is at least two times larger than the inductance value of the first output inductor and the inductance value of the first freewheeling inductor; and the inductance value of the fourth output inductor is at least two times larger than the inductance value of the third output inductor and the inductance value of the second freewheeling inductor.

12. The power conversion system of claim 10 further comprising:

an input capacitor group configured to receive the direct-current-input voltage, the input capacitor group comprising a first capacitor and a second capacitor, the first capacitor and the second capacitor being connected to each other at a middle point, wherein the third filter circuit comprises a first output capacitor and a second output capacitor, wherein one side of the first output capacitor is connected to the middle point and the other side of the first output capacitor is connected to the other side of the second output inductor and wherein one side of the second output capacitor is connected to the middle point and the other side of the second output capacitor is connected to the other side of the fourth output inductor.

13. The power conversion system of claim 10, wherein the first branch comprises a first power switch connected to a first diode, wherein the second branch comprises a second power switch connected to a second diode, wherein the first auxiliary branch comprises a first auxiliary power switch connected to a first auxiliary diode , and wherein the control circuit is configured to generate a first control signal to control the first power switch and the second power switch, and generates a first auxiliary control signal to control the first auxiliary power switch.

14. The power conversion system of claim 13, wherein the third branch comprises a third power switch connected to a third diode, wherein the fourth branch comprises a fourth power switch connected to a fourth diode, wherein the second auxiliary branch comprises a second auxiliary power switch connected to a second auxiliary diode and wherein the control circuit is configured to generate a second control signal to control the third power switch and the fourth power switch, and further configured to generate a second auxiliary control signal to control the second auxiliary power switch.

15. The power conversion system of claim 14, wherein the one side of the first output inductor is connected to the first power switch, the first auxiliary power switch, and the first diode, wherein the other side of the first freewheeling inductor is connected to the fourth power switch and the second auxiliary diode, wherein the one side of the third output inductor is connected to the third power switch, the second auxiliary power switch and the third diode, and wherein the other side of the second freewheeling inductor is connected to the second power switch and the first auxiliary diode.

16. The power conversion system of claim 15, wherein when the alternating-current-output voltage is in a positive half cycle, the first control signal is a first pulse width modulation control signal; the second control signal is a low level signal; the first auxiliary control signal is a high level signal; and the second auxiliary control signal is a second pulse width modulation control signal, and wherein when the alternating-current-output voltage is in a negative half cycle, the first control signal is a low level signal; the second control signal is a third pulse width modulation control signal; the first auxiliary control signal is a fourth pulse width modulation control signal; and the second auxiliary control signal is a high level signal.

17. The power conversion system of claim 16, wherein when the alternating-current-output voltage is operating in the positive half cycle, the power conversion system is configured to provide at least one of: a positive half cycle energy storage loop; a positive half cycle energy release loop; and a positive half cycle reactive power loop, wherein
the positive half cycle energy storage loop of the power conversion system comprises a current flow route through the direct-current-input voltage, the first power switch, the first output inductor, the second output inductor, the alternating-current-output voltage, the fourth output inductor, the second freewheeling inductor, and the second power switch;
the positive half cycle energy release loop of the power conversion system comprises a current flow route through the second output inductor, the alternating-current-output voltage, the fourth output inductor, the second freewheeling inductor, the first auxiliary diode, the first auxiliary power switch, and the first output inductor; and
the positive half cycle reactive power loop comprises a current flow route through the alternating-current-output voltage, the second output inductor, the first freewheeling inductor, the second auxiliary diode, the second auxiliary power switch, the third output inductor, and the fourth output inductor.

18. The power conversion system of claim 16, wherein when the alternating-current-output voltage is operating in the negative half cycle, the power conversion system is configured to provide at least one of: a negative half cycle energy storage loop; a negative half cycle energy release loop; and a negative half cycle reactive power loop, wherein
the negative half cycle energy storage loop of the power conversion system comprises a current flow through the direct-current-input voltage, the third power switch, the third output inductor, the fourth output inductor, the alternating-current-output voltage, the second output inductor, the first freewheeling inductor, and the fourth power switch;
the negative half cycle energy release loop comprises a current flow through the fourth output inductor, the alternating-current-output voltage, the second output inductor, the first freewheeling inductor, the second auxiliary diode, the second auxiliary power switch, and the third output inductor; and
the negative half cycle reactive power loop comprises a current flow through the alternating-current-output voltage, the fourth output inductor, the second freewheeling inductor, the first auxiliary diode, the first auxiliary power switch, the first output inductor, and the second output inductor.

19. An operation method for a power conversion system to convert a direct-current-input voltage into an alternating-current-output voltage, the power conversion system comprising a first-converting circuit, a second-converting circuit, a first filter circuit and a second filter circuit, the first filter circuit comprising a first output inductor and a second output inductor, the second filter circuit comprising a third output inductor and a fourth output inductor; the first-converting circuit receives the direct-current-input voltage and comprises a first branch, a second branch, and a first auxiliary branch, wherein the first auxiliary branch is connected between the first branch and the second branch; the fourth output inductor is connected to the first auxiliary branch; the second-converting circuit is connected to the first-converting circuit in parallel and comprises a third branch, a fourth branch, and a second auxiliary branch, wherein the second auxiliary branch is connected between the third branch and the fourth branch; the second output inductor is connected to the second auxiliary branch; the operation method comprising:
(a) when the alternating-current-output voltage is in a positive half cycle, the direct-current-input voltage being electrically connected to or disconnected to the first output inductor, the second output inductor, the alternating-current-output voltage and the fourth output inductor to form a positive half cycle energy storage loop, and when the direct-current-input voltage is disconnected, the first output inductor, the second output inductor, the alternating-current-output voltage and the fourth output inductor forming a positive half cycle energy release loop;
(b) when the alternating-current-output voltage is in a negative half cycle, the direct-current-input voltage being electrically connected to or disconnected to the second output inductor, the alternating-current-output voltage, the fourth output inductor and the third output inductor to form a negative half cycle energy storage loop, and when the direct-current-input voltage is disconnected, the second output inductor, the alternatingcurrent-output voltage, the fourth output inductor and the third output inductor forming a negative half cycle energy release loop;

(c) when the alternating-current-output voltage is a positive half cycle reactive power, the alternating-current-output voltage, the second output inductor, the third output inductor and the fourth output inductor forming a positive half cycle reactive power loop; and (d) when the alternating-current-output voltage is a negative half cycle reactive power, the alternating-current-output voltage, the fourth output inductor, the first output inductor and the second output inductor forming a negative half cycle reactive power loop, wherein an inductance value of the second output inductor is greater than an inductance value of the first output inductor, and wherein an inductance value of the fourth output inductor is greater than an inductance value of the third output inductor.

20. An operation method for a power conversion system to convert a direct-current-input voltage into an alternating-current-output voltage, the power conversion system comprising a first-converting circuit, a second-converting circuit, a first filter circuit and a second filter circuit, the first filter circuit comprising a first output inductor, a second output inductor and a first freewheeling inductor, the second filter circuit comprising a third output inductor, a fourth output inductor and a second freewheeling inductor; the first-converting circuit receives the direct-current-input voltage and comprises a first branch, a second branch, and a first auxiliary branch, wherein the first auxiliary branch is connected between the first branch and the second branch; the fourth output inductor is connected to the first auxiliary branch through the second freewheeling inductor; the second-converting circuit is connected to the first-converting circuit in parallel and comprises a third branch, a fourth branch, and a second auxiliary branch, wherein the second auxiliary branch is connected between the third branch and the fourth branch; the second output inductor is connected to the second auxiliary branch through the first freewheeling inductor; the operation method comprising:

(a) when the alternating-current-output voltage is in a positive half cycle, the direct-current-input voltage being electrically connected to or disconnected to the first output inductor, the second output inductor, the alternating-current-output voltage, the fourth output inductor and the second freewheeling inductor to form a positive half cycle energy storage loop, and when the direct-current-input voltage is disconnected, the first output inductor, the second output inductor, the alternating-current-output voltage, the fourth output inductor and the second freewheeling inductor forming a positive half cycle energy release loop;

(b) when the alternating-current-output voltage is in a negative half cycle, the direct-current-input voltage being electrically connected to or disconnected to the first freewheeling inductor, the second output inductor, the alternating-current-output voltage, the third output inductor and the fourth output inductor to form a negative half cycle energy storage loop, and when the direct-current-input voltage is disconnected, the first freewheeling inductor, the second output inductor, the alternating-current-output voltage, the fourth output inductor and the third output inductor forming a negative half cycle energy release loop;

(c) when the alternating-current-output voltage is a positive half cycle reactive power, the alternating-current-output voltage, the second output inductor, the first freewheeling inductor, the third output inductor and the fourth output inductor forming a positive half cycle reactive power loop; and (d) when the alternating-current-output voltage is a negative half cycle reactive power, the alternating-current-output voltage, the fourth output inductor, the second freewheeling inductor, the first output inductor and the second output inductor forming a negative half cycle reactive power loop, wherein an inductance value of the second output inductor is greater than an inductance value of the first output inductor and an inductance value of the first freewheeling inductor, and wherein an inductance value of the fourth output inductor is greater than an inductance value of the third output inductor and an inductance value of the second freewheeling inductor.

* * * * *